Patented Nov. 23, 1943

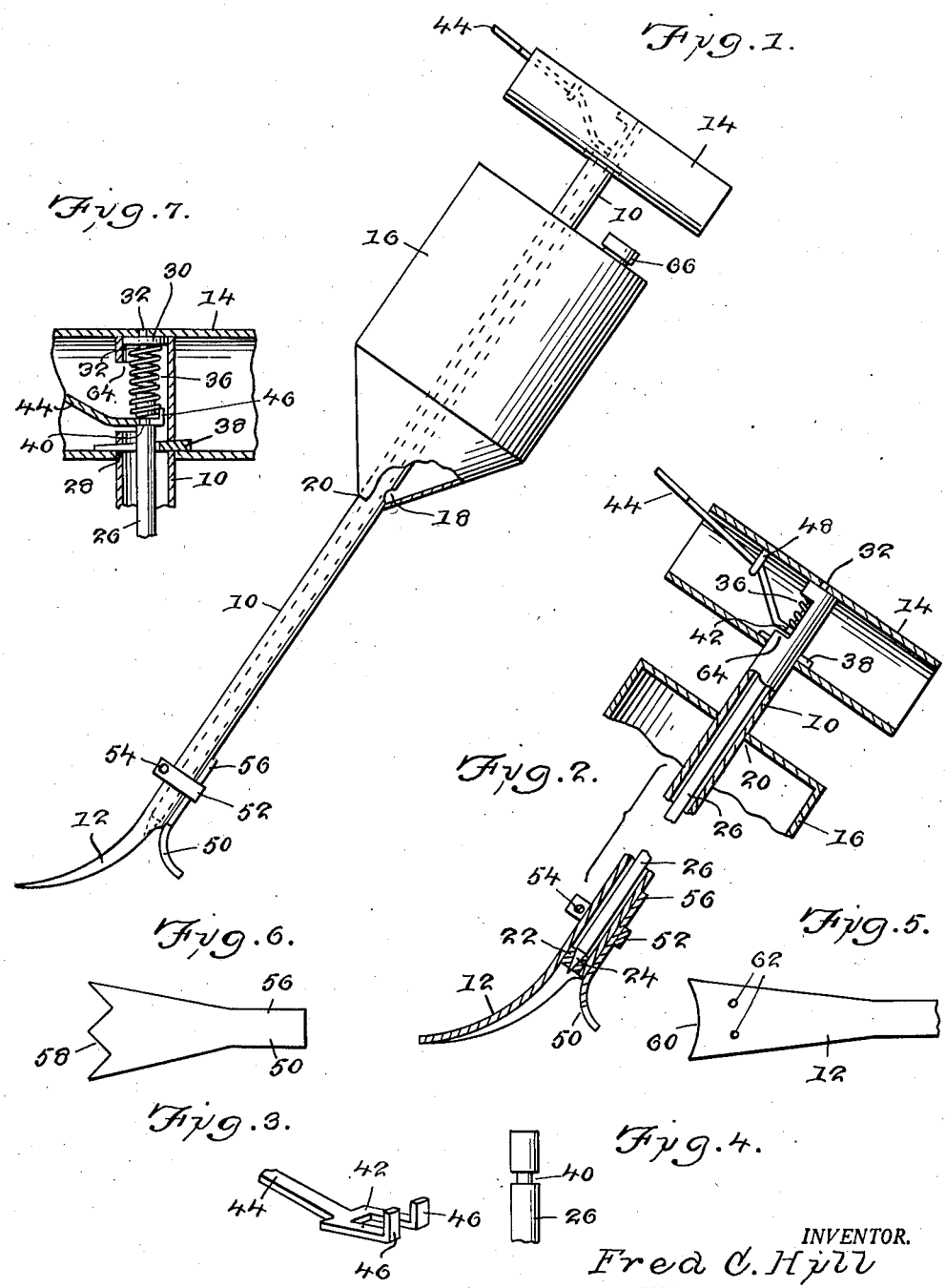

2,335,182

UNITED STATES PATENT OFFICE 2,335,182

WEED-DESTROYING TOOL

Fred C. Hill, Concordia, Kans.

Application June 15, 1942, Serial No. 447,089

2 Claims. (Cl. 47—49)

My invention relates to the eradication of weeds, and has among its objects and advantages the provision of an improved weed destroying tool designed to sever the growth and apply a weed destroying solution to the severed growth.

In the accompanying drawing:

Figure 1 is a side elevational view of a tool in accordance with my invention with a portion broken away for the sake of illustration;

Figure 2 is a fragmentary longitudinal sectional view;

Figure 3 is a perspective view of a valve actuating lever;

Figure 4 is a view of a portion of a valve actuating rod to which the lever of Figure 3 is connected;

Figure 5 is a plan view of a cutting blade;

Figure 6 is a plan view of a partially formed rake element; and

Figure 7 is a sectional detail view of the handle structure.

In the embodiment selected for illustration, I make use of a tube 10 having a severing blade 12 formed at its lower end and a grip or handle 14 attached to its upper end. Upon the tube 10 and closely adjacent the grip 14 is mounted a solution-containing drum 16 having communication with the tube 10 through the medium of a port 18. While the tube 10 extends through the drum 16, the latter is brazed at 20 to provide liquid-tight connections.

Inside the lower end of the tube 10 is fixedly secured a valve seat 22 normally closed by a valve 24 comprising a tapered end on a valve rod 26 lying inside the tube 10. In Figure 7, the grip 14 constitutes a tube having a bore 28 inside which the upper end of the tube 10 fits snugly, with the upper end engaging the opposite side of the grip 14. A disk 30 is mounted inside the tube 10 and is provided with a fixed pin 32 projecting through a bore in the grip 14 inside a compression spring 36 which urges the valve 24 against its seat 22. A wedge 38 is driven through openings in the tube 10 and engages the grip 14 for firmly pressing the end of the tube against the grip. Thus the tube 10 is restrained from axial and lateral shifting with respect to the grip 14.

The valve rod 26 is provided with a circumferential groove 40 for the reception of a fork 42 formed at one end of a valve-operating lever 44. The tines of the fork 42 are bent to provide right angular elements 46, and the spring 36 rests on the fork with its lower end engaging the elements 46 to restrain the fork from accidental displacement from the valve rod 26. Inside the grip 14 is provided an eye 48 through which the lever 44 is projected, which eye constitutes a fulcrum for the lever to the end that the valve 24 may be lifted off the seat 22 through a slightly downward movement of the projecting end of the lever 44.

The blade 12 constitutes a portion of the lower end of the tube 10, which lower end is originally cut away and the remaining portion flattened and curved outwardly, as indicated in Figures 1 and 2. In operation, the blade 12 is pressed into the earth for cutting the grass or weed to be destroyed. As the blade 12 enters the earth, the soil is lifted to provide a pocket about the severed weed. At this time the lever 44 is pressed downwardly to permit the weed destroying solution to flow onto the severed growth and into the pocket in the soil formed by the blade 12. As the blade 12 is withdrawn, the soil falls back in place so as to eliminate objectionable elevations. Because of the pocket formed in the soil, the weed destroying solution is effectively applied to the severed growth, and the curvature of the blade 12 is such as to eliminate the tendency of a bladed tool to penetrate too deeply in the soil, in addition to preventing earth from plugging the valve seat 22.

A rake unit 50 may be secured to the tube 10 through the medium of a band 52 and a bolt 54. This rake unit comprises an original flat sheet of metal cut to provide a shank 56 and teeth 58. The blank from which the rake unit is formed is subsequently bent to provide a curvature of Figure 2, with the split band 52 clamping the shank 56 firmly to the tube 10, the shank 56 being preferably bent to the contour of the tube 10.

The blade 12 is preferably provided with a concaved cutting edge 60 which prevents the cutting edge from slipping laterally of the growth being cut. The blade may also be provided with bolt-receiving openings 62 so as to permit cutting tools of other sizes and shapes to be bolted thereto, should a particular growth require a blade of different size or shape.

The lower end of the spring 36 encircles the extreme upper end of the valve rod 26. The tube 10 is also cut out at 64 to provide an opening for accommodating the inner end of the lever 44. The drum 16 is provided with a cap-closed filling neck 66.

The blade 12 may be plated with hard metal, such as Stoodite, for long wearing purposes.

Without further elaboration, the foregoing will so fully illustrate my invention, that others may, by applying current knowledge, readily adapt the same for use under various conditions of service.

I claim:

1. A weed destroying tool comprising a tubular shank having a weed cutting blade at its lower end, a valve seat at the lower end of said tubular shank adjacent said blade, a drum carried by said tubular shank for containing weed destroying solution and having communication with said tubular shank, a grip at the upper end of said tubular shank, a valve coacting with said valve seat and accessible from a position adjacent the grip for lifting the valve off the seat, said grip comprising a tube arranged transversely of said tubular shank and provided with an opening through which the upper end of the shank is projected, and wedge means acting on said tube and said shank for fixedly relating the tube and the shank.

2. A weed destroying tool comprising a tubular shank having a weed cutting blade at its lower end, a valve seat at the lower end of said tubular shank adjacent said blade, a drum carried by said tubular shank for containing weed destroying solution and having communication with said tubular shank, a grip at the upper end of said tubular shank, a valve coacting with said valve seat and accessible from a position adjacent the grip for lifting the valve off the seat, said grip comprising a tube arranged at right angles to the shank, said tube having an opening, one end of said shank projecting through said opening, said shank being provided with an opening located inside said tube, a spring biasing said valve to a normally closed position, a lever extending into said tube and through said last mentioned opening and operatively connected with said valve, and a fulcrum for said lever attached to said tube.

FRED C. HILL.